United States Patent [19]

Kallenbach

[11] Patent Number: 4,742,593
[45] Date of Patent: May 10, 1988

[54] VALVE MEMBER FOR WATER INTERRUPTION POOL CLEANER

[75] Inventor: Dieter H. F. Kallenbach, Chartwell, South Africa

[73] Assignee: Coxwold (Proprietary) Ltd., Johannesburg, South Africa

[21] Appl. No.: 880,699

[22] Filed: Jul. 1, 1986

[51] Int. Cl.$^4$ .............................................. E04H 3/20
[52] U.S. Cl. ........................................ 15/1.7; 137/843
[58] Field of Search ........................ 137/493, 843, 846; 15/1.7

[56] References Cited

U.S. PATENT DOCUMENTS

| | | |
|---|---|---|
| 3,306,569 | 2/1967 | Bryant . |
| 3,397,860 | 8/1968 | Bushmeyer . |
| 3,441,245 | 4/1969 | Holland et al. . |
| 3,469,582 | 9/1969 | Jackson . |
| 3,504,699 | 4/1970 | Grise .................................. 137/846 |
| 3,522,926 | 8/1970 | Bryant et al. . |
| 3,624,801 | 11/1971 | Gannon . |
| 3,759,289 | 9/1973 | DeWall . |
| 3,883,074 | 5/1975 | Lambert . |
| 3,942,756 | 3/1976 | Brumm et al. . |
| 3,955,594 | 5/1976 | Snow ................................. 137/493 |
| 4,111,391 | 9/1978 | Pilolla . |
| 4,125,125 | 11/1978 | Ezekoye et al. . |
| 4,133,068 | 1/1979 | Hofmann ............................. 15/1.7 |
| 4,566,493 | 1/1986 | Edwards ............................. 137/846 |
| 4,642,833 | 2/1987 | Stoltz et al. ....................... 15/1.7 |

FOREIGN PATENT DOCUMENTS

| | | |
|---|---|---|
| 1308977 | 10/1962 | France ............................... 137/846 |
| 81/850128.0 | 7/1981 | PCT Int'l Appl. . |
| 2094443 | 9/1982 | United Kingdom ................. 137/843 |

*Primary Examiner*—Robert G. Nilson
*Attorney, Agent, or Firm*—Arnold, White & Durkee

[57] ABSTRACT

A valve member for a water interruption pool cleaner installable within the operating head between an open mouth and the flexible hose connection. The valve is a tubular body of flexible material. The body assumes a substantially collapsed condition over a segment thereof in absence of a pressure differential across the wall. Along the collapsed segment, the body has diverging interior walls in the direction of water flow. Longitudinal ribbing on each side of the body may be provided for reinforcement.

12 Claims, 2 Drawing Sheets

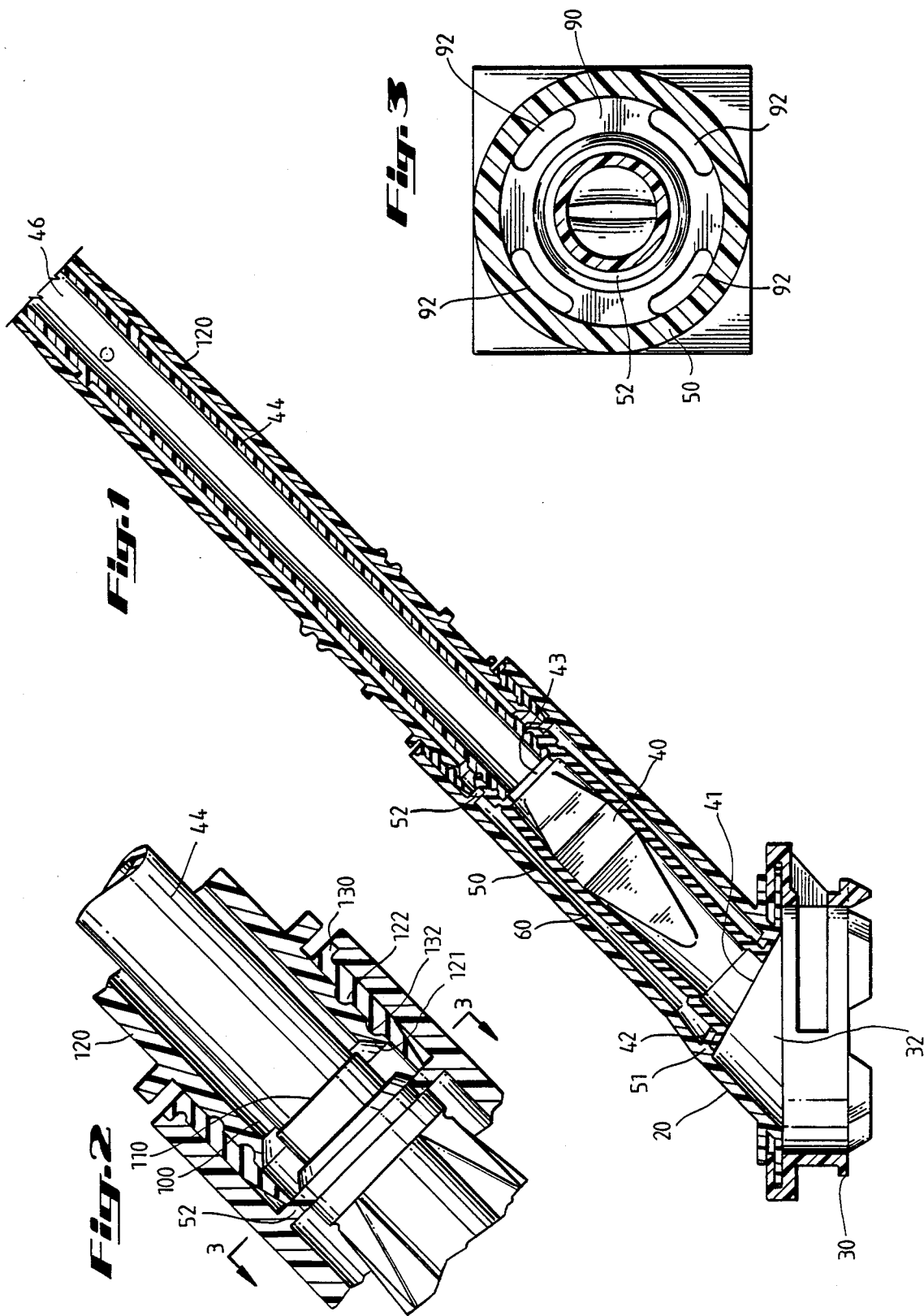

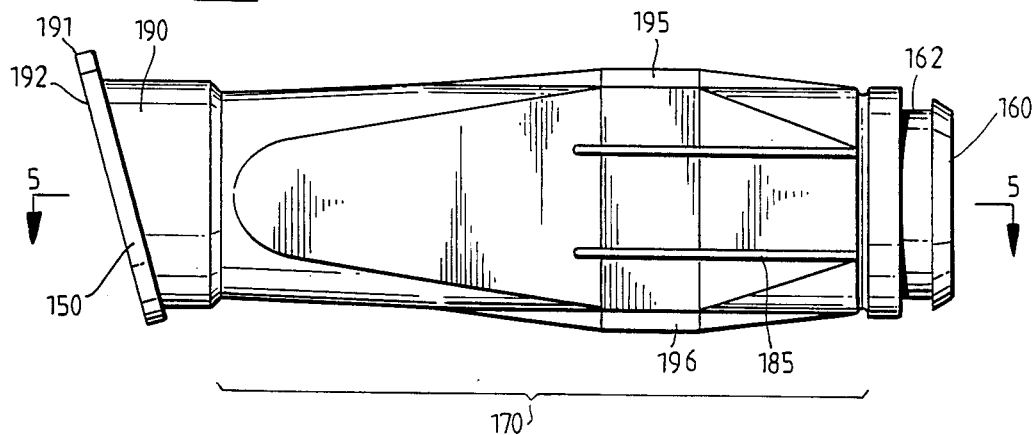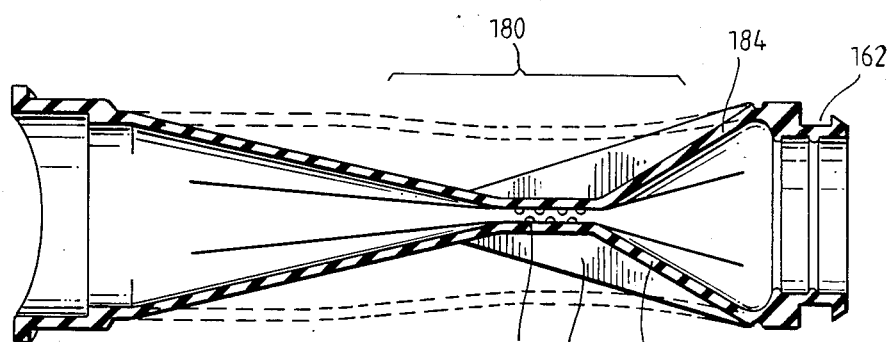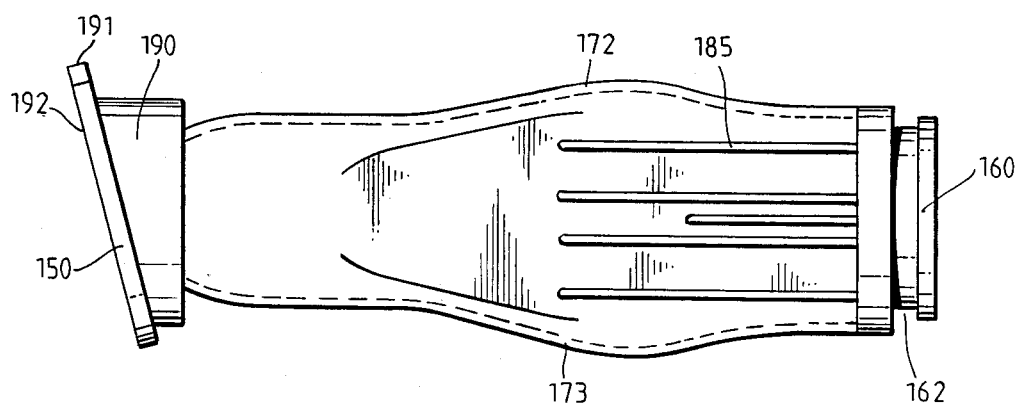

the invention relates to water interruption pool cleaners. More particularly, the invention relates to a valve member for a water interruption pool cleaner that utilizes a flexible tubular member to control water flow through the cleaner.

Various forms of a water interruption type pool cleaner are known. One form utilizes a flexible tubular member in the operating head of the cleaner to perform the autonomous water interruption function. The present invention provides a valve member for use in such pool cleaners.

SUMMARY OF THE INVENTION

A valve member for a water interruption pool cleaner is installable within the operating head between an open mouth and the flexible hose connection. The valve member comprises a tubular body of flexible material having a first end adapted to be secured within the head to be in communication with the open mouth and a second end adapted to be secured within the head in communication with an outlet to the flexible hose.

The body has an intermediate section between the ends that assumes a substantially collapsed condition over a segment thereof in absence of a pressure differential between the interior and exterior. The section preferably is collapsed transversely over a segment.

Along the collapsed segment, the body has diverging interior walls in the direction of water flow therethrough. The walls diverge from a substantially constant diameter that extends for a portion of the section adjacent the first end to a substantially constant, but larger, diameter that extends for a portion of the section adjacent the second end. Further, the divergence is a substantially linear function of the distance along the segment.

The section may be provided with longitudinal reinforcing ribs on each side extending from near the second end to the collapsed segment. Further, vertical ribbing may be provided on the interior of the section on opposing surfaces proximate the collapsed segment.

An enlarged exterior collar and flange at the first end can provide for abutting engagement with a flange in the cleaner head to hold the first end in place. A recessed groove at the second end can provide for interlocking engagement with an internal collar in the cleaner head, to secure the valve member in the head.

BRIEF DESCRIPTION OF THE DRAWINGS

A written description setting forth the best mode presently known for carrying out the present invention, and of the manner of implementing and using it, is provided by the following detailed description of preferred embodiments which are illustrated in the attached drawings wherein:

FIG. 1 is a cross section of a water interruption type pool cleaner that utilizes a flexible tubular member as the valve for effecting the water interruption function;

FIG. 2 is an enlarged view of a portion of the cleaner of FIG. 1;

FIG. 3 is a section taken along lines 3—3 of FIG. 1;

FIG. 4 is a side view of a first embodiment a valve member in accordance with the present invention for use in the cleaner of FIG. 1;

FIG. 5 is a sectional top view of the valve member of FIG. 4; and

FIG. 6 is a side view of a second embodiment of a valve member in accordance with the present invention for use in the cleaner of FIG. 1.

DETAILED DESCRIPTION

Before describing a preferred embodiment of the valve member of the present invention, a description of an automatic pool cleaner which utilizes the valve will be provided.

Referring to FIGS. 1, 2, and 3, an automatic pool cleaner is shown having an operating head 20 and a foot 30 for the cleaner to contact the surface to be cleaned. The head 20 includes an inlet mouth 32 to a flexible tubular valve member or diaphragm 40. The inlet end 41 of valve 40 is enlarged to define a flange 42 which engages and seals against a flange 51 on the body 50. The outlet 43 of valve 40 engages an internal collar 52 formed by plate 90. Engagement is by a circumferential recess in the upper end of valve 40. The valve is insertable into body 50 through mouth 32. The outlet end 43 of valve 40 communicates with an elongated rigid tubular section 44 and outlet 46. The flexible valve member 40 is housed within body 50 to define a chamber 60. The upper or downstream end of chamber 60 is defined by a plate 90. Plate 90 as shown in FIG. 3 is substantially circular as is the cross section of body 50 above or downstream of plate 90. Below or upstream of plate 90, body 50 is square in shape. An annular space 100 exists between body 50 and a section 110 of the rigid tubular section 44. The end of section 110 is inserted into valve 40. A plurality of ports 92 in plate 90 provide for fluid communication between the interior of chamber 60 and the annulus 100.

A substantially rigid conduit 120 fits loosely around rigid section 44 of the tubular passageway above the valve 40. Lower end 121 of conduit 120 defines the lower portion of annular space 100 permitting suction communication from space 100 through slots 92 to chamber 60. End 121 has one or more peripheral grooves 122 on its outer surface.

A bushing 130 is press fit into the round upper end portion of body 50. Bushing 130 has one or more peripheral ridges 132 which snap or otherwise fit loosely within the grooves 122 to lock conduit 120 to the bushing. The conduit 120 is joined to body 50 by simply forcing bushing 130 into the circular upper end portion of the body.

In operation, the chamber 60 has a suction connection to the outlet 46. The chamber becomes filled with water upon immersion of the device through the loose connection at conduit 120 and bushing 130 and through annular space 100. An inlet to chamber 60 may be provided if desired.

It should be clearly understood that it is not essential for the diaphragm valve member to completely cut off flow. It is satisfactory if there is produced an interruption of the water stream through the tubular passageway sufficient to induce movement in the device.

Expansion of the valve and release for it to reassume its relaxed condition is by the creation of a pressure differential across the valve member walls, i.e., a pressure difference between the chamber 60 and the interior of the valve member. This is created by the suction applied to the tube 120. The valve is autonomously opened and closed. Applied suction initially causes valve 40 to open; but with water flow established, the pressure within valve 40 drops below that of chamber 60. The valve thus closes. The cycle autonomously repeats.

Referring now to FIG. 4, there is shown a valve member in accordance with the present invention for the water interruption pool cleaner shown and described in connection with FIGS. 1–3. The valve member comprises a tubular body of flexible material. The material is suitably an elastomeric material. Preferably, the material is polyurethane. One such material is that supplied by Bayer AG & Germany under the mark ELASTOLANE®, part nos. 786, 487, and 385. Another such material is that supplied by Upjohn under the mark PELLATHAN®, part nos. 2103/70A and 2352/70A.

The tubular body may be provided as a one-piece, molded member. The body has a first end 150 adapted to be secured within the head of the cleaner to be in communication with the open mouth. The second end 160 of the body is adapted to be secured within the head in communication with an outlet to the flexible hose. An intermediate section 170 extends between the ends. Referring to FIG. 5 in conjunction with FIG. 4, the intermediate section 170 is shown to assume a substantially collapsed condition over a segment 180. The segment assumes the substantially collapsed condition in absence of a pressure differential between the interior and exterior. The collapsed segment of the section is preferably collapsed transversely over a segment. The collapsed or flattened configuration in the relaxed condition provides for easier starting of the pool cleaner. Also, the configuration places the valve material under less stress in opening. The valve member 40 is molded to form the substantially collapsed segment. The plastic material is resilient and thus maintains the substantially collapsed condition in absence of manipulative pressure differential across the valve wall.

In a second embodiment of FIG. 6, along the collapsed segment, the body section has diverging interior walls 172 and 173. The walls diverge in the direction of water flow therethrough. The walls diverge from a substantially constant diameter that extends for a portion of the section adjacent the first end to a substantially constant, but larger, diameter that extends for a portion of the section adjacent the second end. The divergence is a substantially linear function of the distance along the segment.

The intermediate section 170 is provided with longitudinal reinforcing ribs 185 on each side extending from near the second end to the collapsed segment. The ribs serve as a means for stiffening the valve member in the axial or longitudinal direction. The stiffness provided by the ribs enables the valve to resist the forces acting on it during closure which urge the collapsed segment into the outlet, and reduces the tendency of the valve to fall into the outlet.

Vertical ribbing 194 may be provided on the interior of the throat section on opposing surfaces proximate the collapsed segment. First and second longitudinal ribs 195 and 196 are also provided on the exterior of the body and extend over a portion thereof transversely to the collapsed segment.

The wall thickness of the valve varies along its length. The wall is thicker in the region 184 (FIG. 5) between the outlet and the substantially collapsed segment than between the inlet and the collapsed segment. The difference in wall thickness enables the valve to flex. Particularly, the edge regions of the segment are formed with a wall thickness less than the remainder of the valve to permit flexure of the valve and promote a hinge effect movement that enables more effective expansion and contraction of the segment when in operational use. Further, the thicker wall region assists the external ribs in providing stiffness to the valve member.

In the embodiment shown, an enlarged exterior collar 190 and flange 192 at the first end provides for abutting engagement with a flange in the cleaner head to hold the first end in place. A recessed groove 162 at the second end 160 provides for interlocking engagement with an internal collar in the cleaner head, to secure the valve member in the head.

Valve member 40 is installed in the cleaner of FIG. 1 by introducing the valve member through the open mouth portion. The second end 160 is first introduced and pushed into position where the recessed groove 162 interlocks with the collar 52. The flange 192 at the first end is then in abutment with flange 51. The locating tabs 191 (FIGS. 4 and 6) on the end flanges ensure that the valve is inserted in the head without twisting.

The foregoing description has been directed to a particular preferred embodiment for purposes of explanation and illustration. It will be apparent, however, to those skilled in this art that the structure of the valve member shown may be changed without departing from the essence of the invention. It is the intention that the following claims cover all equivalent modifications and variations which fall within the scope of the present invention.

What is claimed is:

1. A valve member for a water interruption pool cleaner including an operating head having an open mouth to be disposed proximate the surface to be cleaned and an outlet for connection to a flexible hose to permit suction to be applied to the head from the hose to suck water through the head, said valve member defining a water flow passage through the head between the mouth and the outlet and being adapted to transversely contract and expand over at least a portion of its length to create interruptions in water flow to the outlet so as to produce movement of the cleaner along a submerged pool surface, said valve member comprising:
   a tubular body of flexible material having a first inlet end adapted to be secured within the head to be in communication with the mouth and a second outlet end adapted to be secured within the head to be in communication with the outlet to the flexible hose; said body having an intermediate section between the ends assuming a substantially collapsed condition in a localized segment thereof in absence of a pressure differential between the interior and exterior.

2. The valve member of claim 1 further comprising means for stiffening a region of the intermediate section between the outlet and the substantially collapsed segment.

3. The valve member of claim 1 wherein the intermediate section of the body has external longitudinal ribs on each side extending from proximate the second end to proximate the collapsed segment.

4. The valve member of claim 1 wherein the first end has an enlarged exterior collar and a flange extending therefrom for abutting engagement with an anchoring flange in the cleaner head.

5. The valve member of claim 1 wherein the second end has a recessed groove for interlocking engagement with an internal collar in the cleaner head.

6. The valve member of claim 1 or 2 wherein the intermediate section of the body has internal longitudinal ribbing on opposing surfaces proximate the collapsed segment and extending transversely to the direction in which the segment collapses.

7. The valve member of claim 4 wherein the flange has a locating tab thereon to establish the rotational orientation of the first end of the body within the head.

8. The valve member of claim 5 wherein the second end further includes a locating tab adjacent the recessed groove for establishing the rotational positioning of the second end of the body within the head.

9. The valve member of claim 1 wherein the body has a wall thickness which varies over its length to provide regions of reduced wall thickness adjacent to and on opposite sides of the collapsed segment.

10. The valve member of claim 1 wherein the body has diverging interior walls along the collapsed segment in the direction of water flow therethrough.

11. The valve member of claim 1 wherein the body of flexible material comprises a resilient plastic material molded to form the collapsed segment.

12. A valve member for a water interruption pool cleaner including an operating head having an open mouth to be disposed proximate the surface to be cleaned and an outlet for connection to a flexible hose to permit suction to be applied to the head from the hose to suck water through the head, said valve member comprising:

a tubular body of flexible material having a first inlet end adapted to be secured within the head to be in communication with the mouth and a second outlet end adapted to be secured within the head to be in communication with the outlet to the flexible hose;

said body having an intermediate section between the ends assuming a substantially collapsed condition in a localized segment thereto in absence of a pressure differential between the interior and exterior; the intermediate section of the body having internal ribbing on opposing surfaces proximate the collapsed segment and extending transversely to the direction in which the segment collapses.

* * * * *